July 3, 1956  M. FISCHMAN  2,753,519
DYNAMIC PHASE SHIFTER
Filed May 20, 1955  2 Sheets-Sheet 1

INVENTOR
MARTIN FISCHMAN
BY Theodore C. Jay
ATTORNEY

July 3, 1956     M. FISCHMAN     2,753,519
DYNAMIC PHASE SHIFTER

Filed May 20, 1955     2 Sheets-Sheet 2

INVENTOR
MARTIN FISCHMAN
BY Theodore C. Jay Jr.
ATTORNEY

United States Patent Office 2,753,519
Patented July 3, 1956

2,753,519
DYNAMIC PHASE SHIFTER

Martin Fischman, Wantaugh, N. Y., assignor to Sylvania Electric Products Inc., a corporation of Massachusetts Application May 20, 1955, Serial No. 509,871

11 Claims. (Cl. 323—122)

My invention relates to dynamic phase shifters.

The electronic arts often have need for a device which shifts the phase of an alternating voltage of fixed frequency in accordance with the variations of an applied control signal. Such a device is termed a dynamic phase shifter. It is known that in such devices the phase of an alternating voltage can be varied by suitably adjusting variable resistance or reactive circuit components. Conventionally this adjustment is carried out by manual or mechanical means. In either situation this type of phase control can only be carried out successfully when the rate at which the various phase shifts are produced is low. This type of adjustment cannot respond properly to phase shifting rates falling within the radio frequency range or higher.

Accordingly, it is an object of the present invention to increase the rate of phase shift in dynamic phase shifters.

Another object is to provide a new and improved dynamic phase shifter of the character indicated.

Still another object is to provide a dynamic phase shifter which can be constructed simply and inexpensively and which can respond correctly at high phase shifting rates.

These and other objects of the invention will either be explained or will become apparent hereinafter.

A dynamic phase shifter in accordance with my invention includes a network provided with a capcaitor and a non-linear resistance element in series connection and connected between first and second terminals. The common junction between the capacitor and the element is conencted to a third terminal. The element which can be, for example, a thyrite resistor or a diode, has a resistance characteristic which varies with the voltage applied thereacross, or, expressed in another manner, varies with the current therethrough.

A first alternating voltage having a given frequency is applied between the first terminal and a fourth terminal. A second like voltage opposed in phase to the first voltage is applied between the second and fourth terminals. As a result, a third alternating voltage having the same frequency appears as an output voltage between the third and fourth terminals.

I further provide means connected to the element and responsive to a variable control signal to vary the resistance of the element in accordance with the variations of the control signal. The phase of the output voltage relative to the first and second voltages is shifted in accordance with these resistance variations.

Illustrative embodiments of the invention will now be described in detail with reference to the accompanying drawings wherein.

Figure 1:
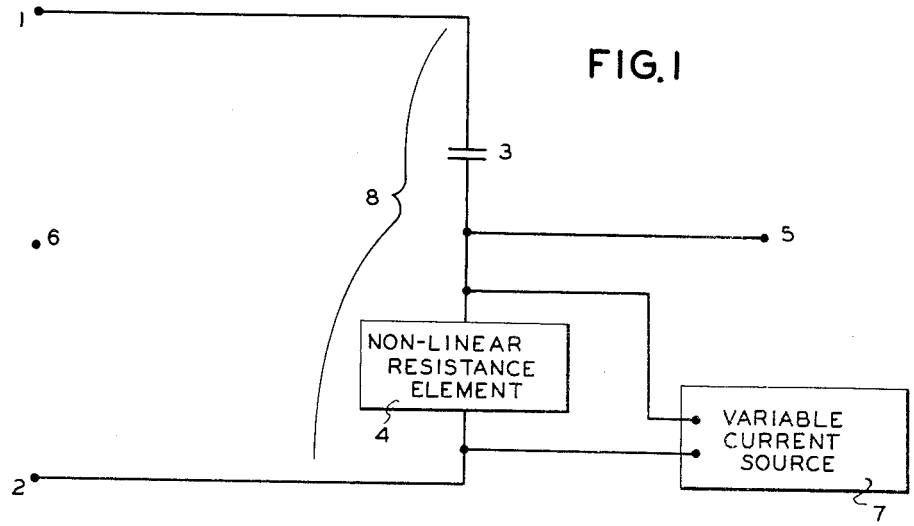
Fig. 1 is a circuit diagram illustrating the basic features of my invention.

Referring now to Fig. 1, a network identified generally at 8 includes in series connection capacitor 3 and non-linear resistance element 4 and is connected between terminals 1 and 2. This element can be a thyrite resistor, or a diode or other conventional element having a resistance characteristic which varies with the current therethrough. The common junction of the capacitor and the diode is connected to a terminal 5.

A first incoming alternating voltage of fixed frequency is applied between terminals 1 and 6. A second like voltage opposed in phase to the first voltage is applied between terminals 2 and 6. As a result a third output voltage appears between terminals 5 and 6.

A source of a variable control signal, in this example, a source 7 of a variable control current, is connected across element 4 to vary the resistance thereof in accordance with variations in the control current.

As the resistance of the element changes, the phase of the third voltage (with respect to the first and second voltages) is shifted accordingly.

Figure 4:
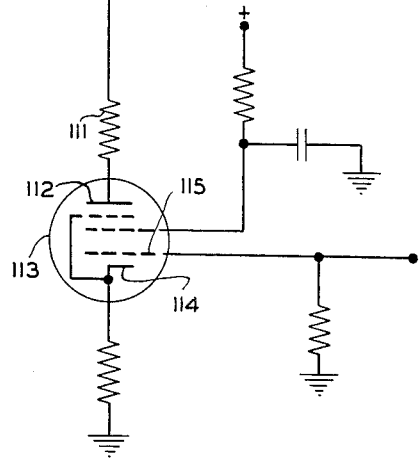
Fig. 4 is a vector diagram showing the relationship of the various voltages utilized in Figs. 1 and 3.
Figure 4:
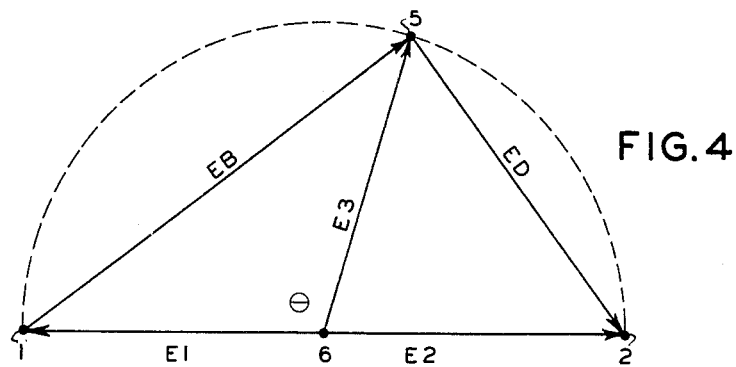

The operation of this circuit can best be understood from a consideration of the various voltage relationships as illustrated in vector form in Fig. 4 wherein the various numbers identify the terminals of Fig. 1.

The first voltage identified as $E_1$ and applied between terminals 1 and 6 is 180° out of phase with the second voltage $E_2$ applied between terminals 2 and 6. The difference between these two voltages appears across the series combination of the capacitor and the element. The voltage across the capacitor is identified as $E_c$ while the voltage across the element is identified as $E_d$. Since the capacitor is essentially a pure reactance and the element is essentially a pure resistance, voltages $E_c$ and $E_d$ assume different phase angles with respect to voltages $E_1$ and $E_2$, so that the output voltage appearing between terminals 5 and 6 and identified as $E_3$ assumes some phase angle $\theta$ with respect to voltage $E_1$.

As the resistance of the element is varied in accordance with the variations in the control current, the difference between voltages $E_1$ and $E_2$ remaining constant, voltages $E_c$ and $E_d$ change in inverse ratio, and the phase angle $\theta$ also changes, the absolute value of voltage E remaining constant.

Figure 2:
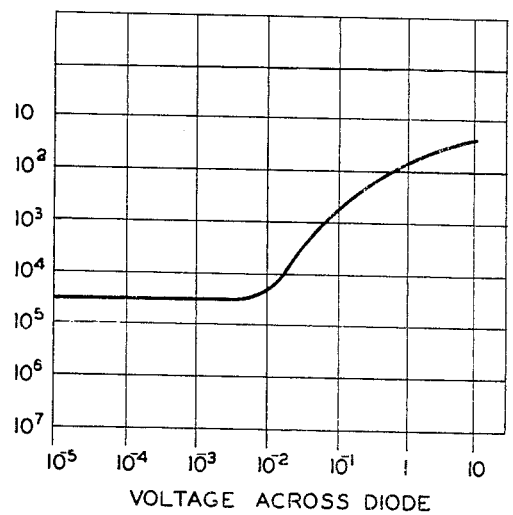
Fig. 2 is a graph of the resistance-voltage characteristics of a typical semi-conductor diode.

Referring now to Fig. 2, it will be seen that the resistance of a typical semi-conductor or crystal diode, when conducting, varies with the voltage applied across the diode, or expressed in another manner, varies with the current flowing therethrough. In this example, the resistance decreases as the voltage increases.

Figure 3:
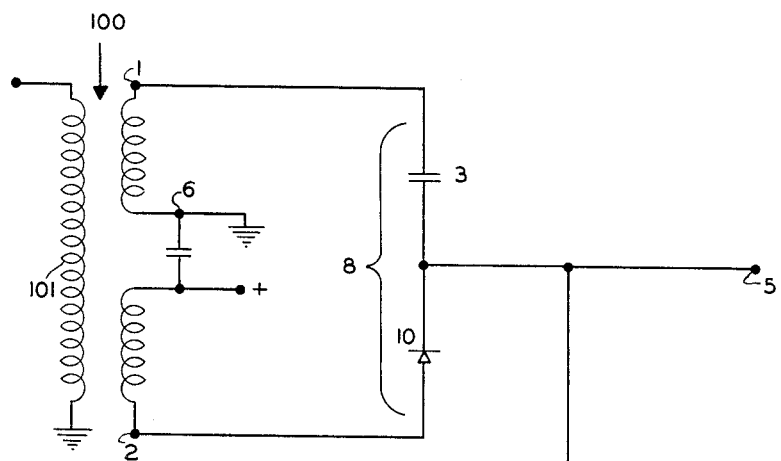
Fig. 3 is a circuit diagram of an embodiment of my invention which uses a diode as a non-linear resistance element.

A diode 10 exhibiting this resistance variation is used as a non-linear resistance element as in the circuit of Fig. 3. A transformer identified generally at 100 is provided with a primary winding 101 (one end of which is grounded) and first and second secondary windings having the opposite polarities and identified at 102 and 103 respectively. Adjacent ends of windings 103 are interconnected by a capacitor 104. The junction between winding 102 and capacitor 104 is grounded and is also connected to terminal 6. The junction between capacitor 104 and winding 103 is connected to a part of positive operating potential 106. The opposite ends of windings 102 and 103 are shunted by a network identified generally at 8 and including, in series connection, capacitor 3 and crystal diode 10. The junction of capacitor 108 and diode 109 is connected to terminal 5 and is also connected through resistor 111 to the anode 112 of an electron tube 113. The cathode 114 of this tube is connected through a suitable biasing resistor 115 to ground.

An incoming alternating voltage of fixed frequency is applied across winding 101 and transformed into first and second like alternating voltages which are opposed in phase and which appear across windings 102 and 103 respectively. As a result, a third alternating voltage of the same frequency appears between terminals 5 and 6 in the same manner as in Fig. 2.

Tube 113 is a pentode which, as well known, can be regarded as a current generator, the variation in current flow through the tube being substantially independent of variations in applied operating potential and depending mainly upon variations of signals appearing across the grid circuit.

Accordingly, when a variable control signal is applied to the grid 116 of tube 113, the resulting current variations vary the resistance of diode 4 in the manner indicated previously.

As a result, the phase of the output voltage relative to the first and second voltage is varied in accordance with the control signal variations.

The circuit of Fig. 3 was tested successfully using a diode commercially designated as IN34 and a pentode commercially designated as 6AU6. Two or more such circuits can be connected in cascade to obtain any maximum phase shift desired.

The voltage drop across the diode caused by the flow of control current is normally adjusted to be larger than that caused by the alternating voltages in order to insure that the diode remains conductive at all times. Should the voltage drop produced by the control current be smaller than that produced by the alternating voltages, the diode will be rendered non-conductive periodically, and the output voltage will be distorted. For many applications, however, this distortion is not objectionable, since the phase shift control is unimpaired.

While I have shown and pointed out my invention as applied above, it will be apparent to those skilled in the art that many modifications can be made within the scope and sphere of my invention as defined in the claims which follow.

What is claimed is:

1. In combination, first, second, third and fourth terminals; a network including a capacitor and a diode in serial connection and connected between said first and second terminals, the common junction of said capacitor and said diode being connected to said fourth terminal, said diode during current conduction having a resistance characteristic at which the diode resistance varies in accordance with variations in the current flow therethrough; means to apply first and second alternating voltages of fixed frequency between the first and third terminals and the second and third terminals respectively, said first and second voltages being opposed in phase and being otherwise identical, whereby a third alternating voltage of the same frequency and displaced in phase with respect to said first and second voltages appears between the fourth and third terminals; and means connected to said diode and responsive to a variable control signal to vary the diode resistance and thereby shift the phase of said third voltage accordingly.

2. The combination as set forth in claim 1 wherein said control signal is a unidirectional signal, said diode being poled in a direction at which said diode presents a low resistance path to said signal.

3. The combination as set forth in claim 2 wherein the magnitude of said signal is always larger than the instantaneous sum of the first and second voltages.

4. In combination, means responsive to an incoming alternating voltage of given frequency to derive therefrom first and second like alternating voltages having the same given frequency, said first and second voltages being in phase opposition; a network connected between first and second terminals and including in series connection a capacitor and a diode, the common junction of said capacitor and diode being connected to a third terminal, said diode when conducting having a resistance which varies in accordance with variations in current flow therethrough; means to apply said first and second voltages between said first terminals and a fourth terminal and between said second and fourth terminals respectively whereby a third alternating voltage of the same frequency and exhibiting a predetermined phase angle with respect to said first voltage appears between said third and fourth terminal; and means coupled to said diode and responsive to a variable control voltage to vary the diode resistance and thus vary said phase angle accordingly.

5. The combination as set forth in claim 4 wherein said means responsive to the incoming voltage includes a transformer with one primary winding and two secondary windings, said secondary windings having opposed polarities.

6. The combinations as set forth in claim 5 wherein said means coupled to said diode includes an electron tube having anode, cathode and control grid electrodes.

7. An electronic circuit comprising first and second inductors; a first capacitor connecting one end of said first inductor to one end of said second inductor, the other ends of said inductors being connected to first and second terminals respectively, the junction of said first inductor and said first capacitor being coupled to a third terminal, the junction of said second inductor and said first capacitor being connected to a first point of operating potential, said third terminal being connected to a second point of operating potential; a series circuit connected between said first and second terminals and including a second capacitor and a semi-conductor diode; the junction of said second capacitor and said diode being connected to a fourth terminal; and an electron tube provided with an anode, a cathode and a grid and circuits therefor, the anode-cathode circuit being connected between said third and fourth terminals.

8. The circuit as set forth in claim 7 wherein said first and second indicators have opposed polarities and wherein said electron tube is a pentode.

9. The circuit as set forth in claim 8 wherein said diode when conducting has a resistance which varies with the magnitude of the current flowing through said diode, said circuit further including means coupled to said inductors to develop first and second like alternating voltages of the same fixed frequency across the corresponding indicators, said first and second voltages being opposed in phase, whereby a third alternating voltage displaced in phase with respect to said first and second voltages appears between said third and fourth terminals; and means to supply a variable control signal to the grid circuit of said tube to vary the resistance of said diode and vary the phase displacement of said third voltage accordingly.

10. In combination, first, second, third and fourth terminals; a network including a capacitor and a non-linear resistance element in serial connection and connected between said first and second terminals, the common junction of said capacitor and said element being connected to said fourth terminal, said element having a resistance characteristic at which the resistance varies in accordance with variations in the current flow therethrough; means to apply first and second alternating voltages of fixed frequency between the first and third terminals and the second and third terminals respectively, said first and second voltages being opposed in phase and being otherwise identical whereby a third alternating voltage of the same frequency and displaced in phase with respect to said first and second voltages appears between the fourth and third terminals; and means connected to said element and responsive to a variable control signal to vary the element resistance and thereby shift the phase of said third voltage accordingly.

11. The combination as set forth in claim 10 wherein said control signal is a unidirectional signal.

No references cited.